United States Patent [19]
Bayly

[11] 3,878,947

[45] Apr. 22, 1975

[54] VOLUMETRIC FEEDER FOR ROTARY FURNACES

[75] Inventor: William I. Bayly, Livingston, N.J.

[73] Assignee: American Gas Furnace Company, Elizabeth, N.J.

[22] Filed: Dec. 28, 1973

[21] Appl. No.: 426,773

[52] U.S. Cl. .............. 214/18 K; 214/152; 222/167; 432/117
[51] Int. Cl. ............................................. F27b 7/32
[58] Field of Search ...... 214/18 R, 18 K, 35 R, 152; 432/103, 117; 222/167

[56] References Cited
UNITED STATES PATENTS
3,280,993  10/1966  Wolfe .............................. 214/18 K

*Primary Examiner*—Robert G. Sheridan
*Attorney, Agent, or Firm*—Omri M. Behr; Peter J. Gaylor

[57] ABSTRACT

Disclosed is a volumetric feeder for charging batches of work pieces to a rotary furnace. The volumetric feeder includes a hopper section having an open front end, sloping sides and a rear plate section having a J-shaped opening therein. Integral with the rear plate and connected with the J-shaped opening is a feed chute which communicates the opening with a measuring station having predetermined, but independently variable dimensions. At the exit port of the measuring station is a cylinder operated trap door gate which precedes a spiral discharge chute which in turn connects with the mouth of the rotary furnace.

As the volumetric feeder rotates with the rotary furnace, work pieces are caused to tumble about in the hopper. The sloping sides of the hopper help to draw the work pieces into the J-shaped opening and from there into the feed chute. Further rotation causes the work pieces to fall into the measuring station where a predetermined volume of work pieces will reside. At a later point in the rotation cycle the gate at the bottom of the measuring station opens and a predetermined batch of work pieces is caused to be discharged into the discharge chute and from there into the mouth of the rotary furnace.

13 Claims, 9 Drawing Figures

VOLUMETRIC FEEDER FOR ROTARY FURNACES

BACKGROUND OF THE INVENTION

1. Field of the Invention

This invention relates generally to volumetric feeders and more specifically to a volumetric feeder for a rotary furnace.

2. Description of the Prior Art

In conventional rotary retort furnaces it is often difficult if not impossible to satisfactorily feed metal parts and the like into the furnace without either damaging the metal parts or allowing too much atmospheric air to enter. One solution to this problem is discussed in the patent to Charles W. Wolfe, U.S. Pat. No. 3,280,993. The Wolfe device comprises a spiral loading chute which feeds metal parts into the retort furnace at a predetermined rate. A gate mounted in the spiral chute selectively passes materials therethru while it seals off the furnace from the outside air.

One major difficulty with such prior art approaches is that the batch delivered to the furnace is frequently of an irregular volume. This can be a problem because the metal parts act like a heat sink and unless they are evenly loaded into the spiral retort uneven temperature distribution may result. Uneven temperature distribution in turn can cause the quality of the output to vary. Up until the inventor's discovery satisfactory solutions to this problem have not been known.

SUMMARY OF THE INVENTION

According to a preferred embodiment of the present invention a rotary volumetric feeder is combined with a rotary retort furnace. The feeder assembly is rigidly attached to the furnace in such a fashion that both rotate in unison. The volumetric feeder includes a hopper section, having an open front end, sloping side walls and a rear plate with a J-shaped opening therein. The term J is meant also to comprehend a generally L-shaped opening also. The J-shaped opening forms one end of a feed chute which terminates at the inlet port of a measuring station. The outlet port of the measuring station is in turn connectable to a spiral discharge chute which empties into the retort furnace mouth. An air cylinder actuated gate controls the passageway between the measuring station and the discharge chute. The measuring station includes a plunger means which may be adjusted within the interior of the measuring station so as to change the volume thereof in discrete amounts.

At the beginning of the feed cycle, the hopper section of the volumetric feeder is charged with work pieces, typically, small metal objects. The rotary furnace and the volumetric feeder may or may not be rotating at the time of charging, however, the volumetric feeder is set in rotary motion thereafter thereby initiating the batch feeding cycle. At the beginning of the batch feeding cycle the lower portion of the J-shaped opening collects metal work pieces that slide therein under the influence of gravity and assisted by the sloping sides of the hopper. The opening therefor scoopes up these metal parts and as the feeder rotates further the metal parts start to slide down the feed chute communicating with the opening. A small ledge or ridge running substantially the length of one side of the opening helps to retain the metal work pieces while at the same time permitting any excess to fall back into the bin. When the work pieces reach the far end of the feed chute, removed from the point of initial entry, they then fall into a measuring station which at that point in the cycle is directly below the feed chute. The volume of the measuring station is precisely controlled by a plunger which is slideably received within the measuring station and lockable at various different intervals therein. The volume of material accepted by the measuring station depends upon the displacement of the plunger and the natural angle of repose of the metal work pieces prior to the opening of the discharge gate. As the cycle continues and the measuring station has accepted a predetermined batch charge of work pieces the discharge gate is caused to open and the metal work pieces are then received by the spiral discharge chute. Continued rotation causes the spiral discharge chute to feed the predetermined batch of work pieces into the mouth of the retort furnace. The gate device is normally quickly opened and shortly thereafter quickly closed to prevent an excessive amount of atmosphere from contaminating the gas and temperature balance of the furnace.

It is therefore an object of the present invention to provide a volumetric feeder for a rotary type retort furnace which will feed batches of predetermined volumes into said furnace.

It is another object of the present invention to provide an automatic volumetric feeder which will prevent an excessive amount of atmosphere from entering a retort furnace during the charging cycle.

It is a further object of the present invention to provide a volumetric feeding device for a rotary furance in which the feeding and volume measurement occur in the same integral piece of equipment.

These and other objects and advantages of the invention will be more fully understood upon a reading of the following specification taken in view of the attached drawings.

DETAILED DESCRIPTION OF THE INVENTION

During the course of this description like numerals will be used to indicate like elements as shown in different Figures.

Figure 1:
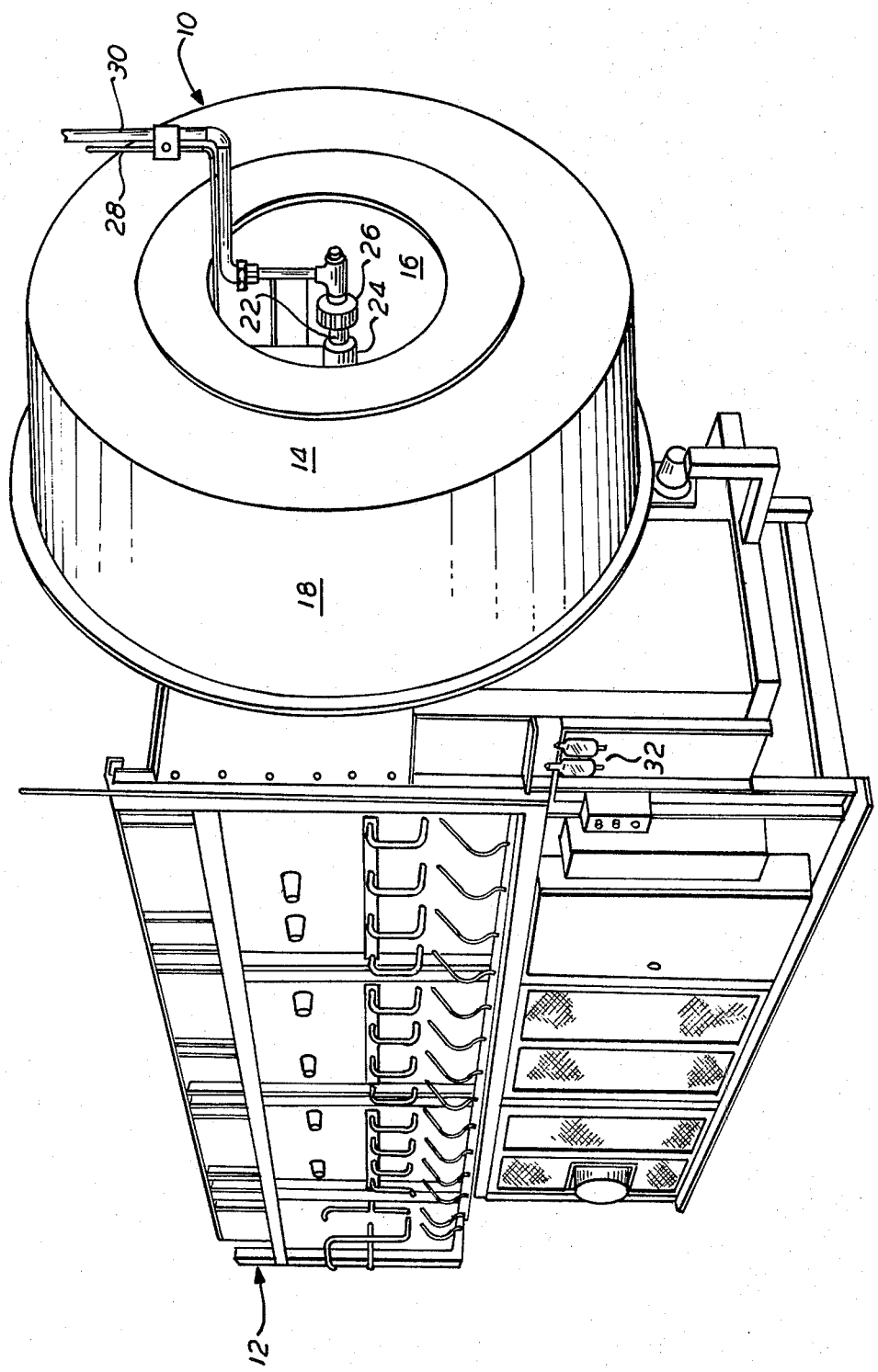
FIG. 1 is a view of a volumetric feeder as used on a conventional rotary furnace.

A volumetric feeder 10 similar to that of the present invention is shown in place on a conventional spiral rotary furnace 12 in the illustration of FIG. 1. The visible elements in this view include a front section 14 including a hole or charging opening 16 therein, a tapered sidewall section 18, and a rear plate section 20, the rim of which is just visible. Projecting thur opening 16 is a centrally located pipe 22. Connected to pipe 22 are a pair of rotary fittings 24 and 26 which communicate respectively with air cylinder supply line 28 and atmosphere inlet tubing 30. Air pressure regulating and filtering apparatus is shown generally as element 32 and is connected to the stationary portion of the rotary furnace 12. Air pressure is supplied selectively to line 28 by a limit switch valve mechanism 110 and cam 112 which are attached to the back plate 20. The feeder thus far described is therefore similar in outward appearance to the spiral loading chute apparatus described in U.S. Pat. No. 3,280,993. The improvement over this prior art will be more fully appreciated with reference to the following drawings.

While the rotary furnace as shown in FIG. 1 is illustrated as lying flat in the horizontal plane, that is not always the case. Frequently the furnace is tilted at an inclination relative to the floor and in that attitude the feeder is tilted also. It should also be appreciated that the internal rotary portion of the furnace rotates in conjunction with the feeder.

Figure 2:
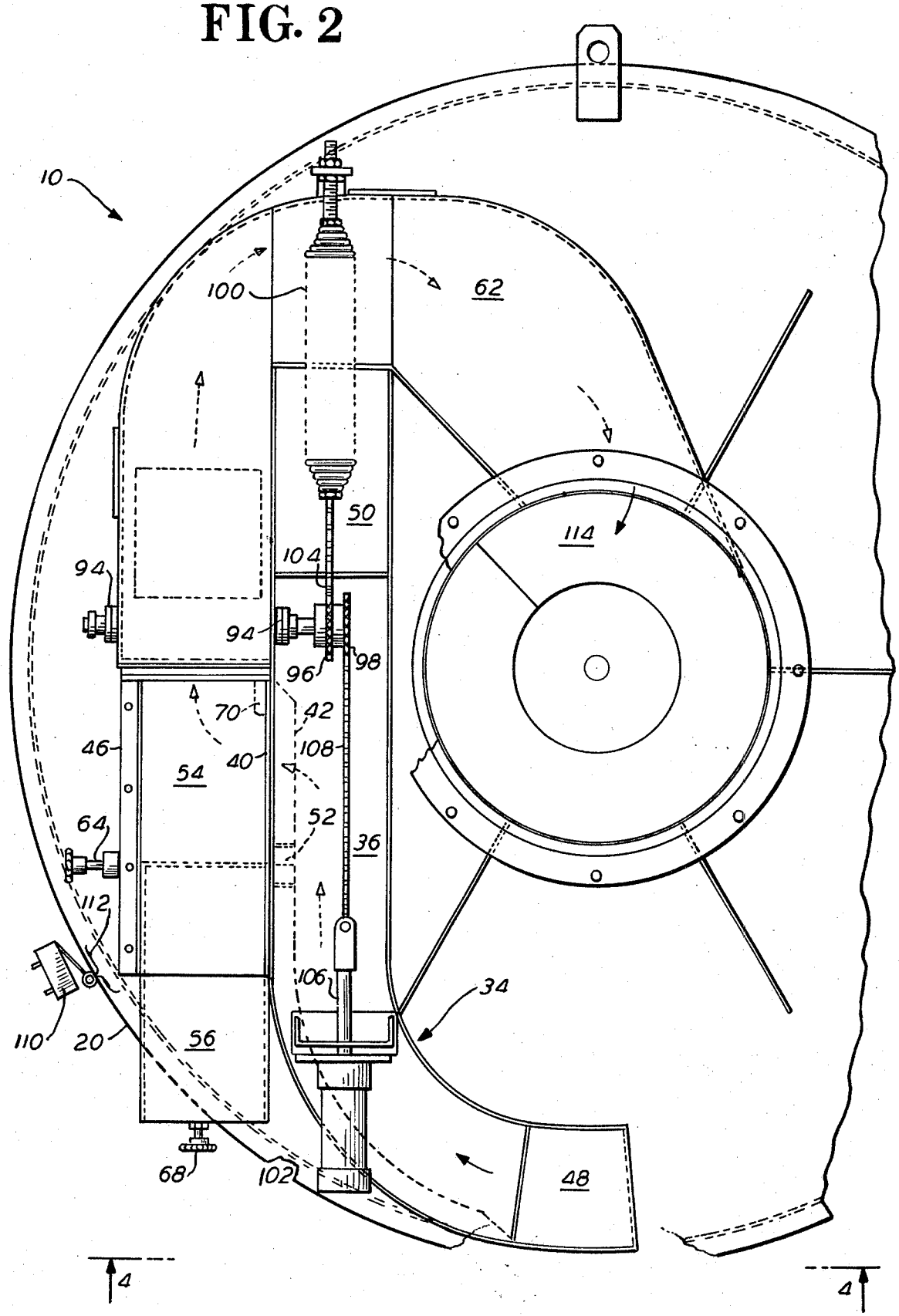
FIG. 2 is an elevated view of the volumetric feeder of the present invention as seen from the rear.
Figure 3:
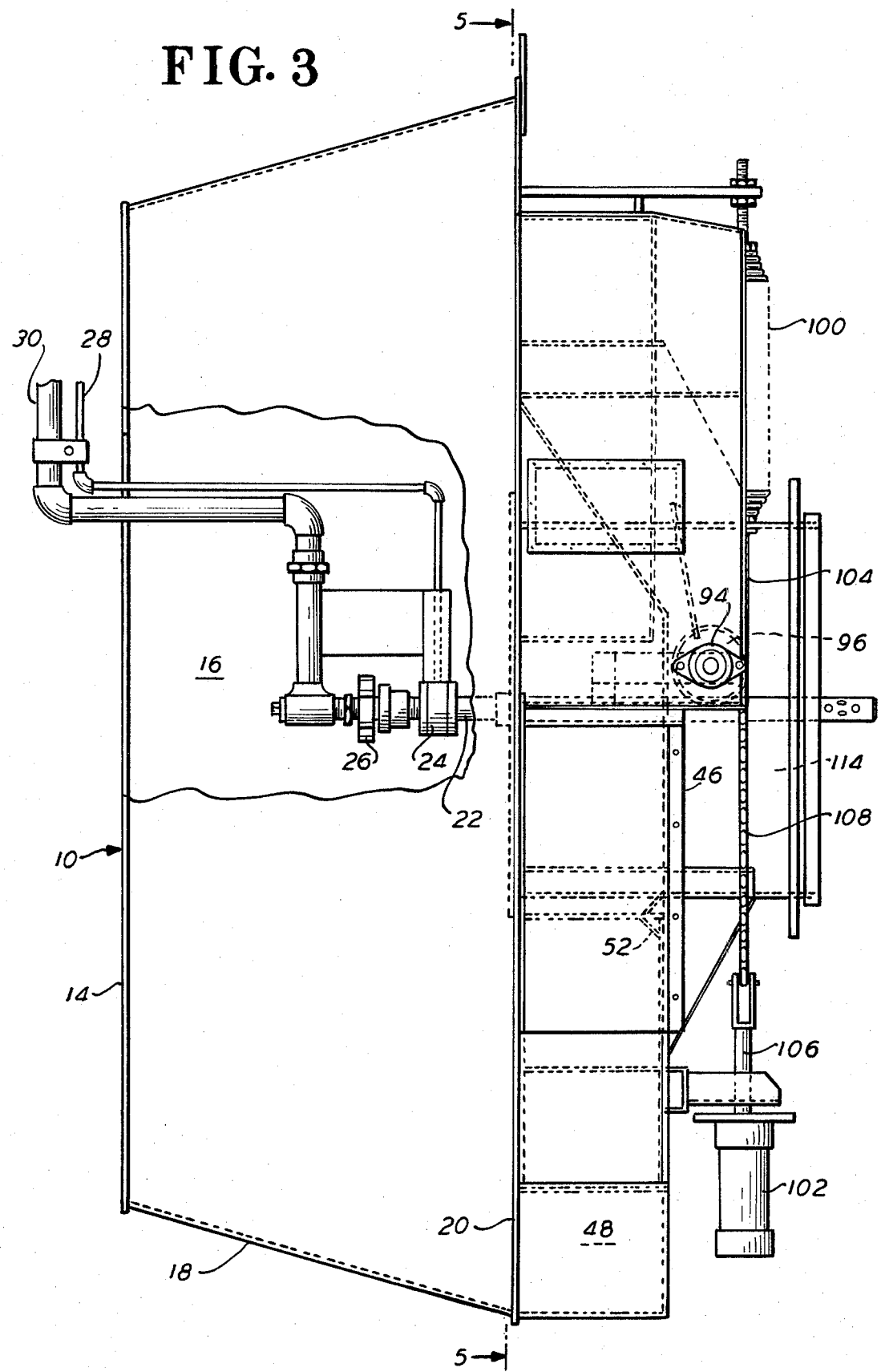
FIG. 3 is an elevated view of the volumetric feeder as seen from the side.
Figure 4:
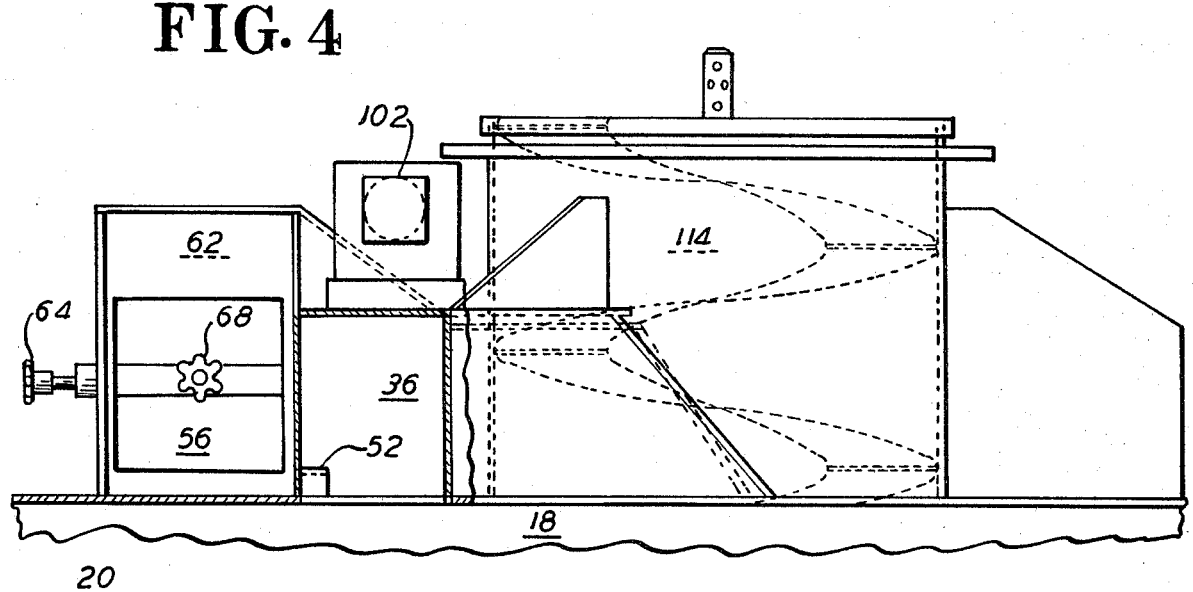
FIG. 4 is a view of the same volumetric feeder as seen from 4—4 in FIG. 2.
Figure 5:
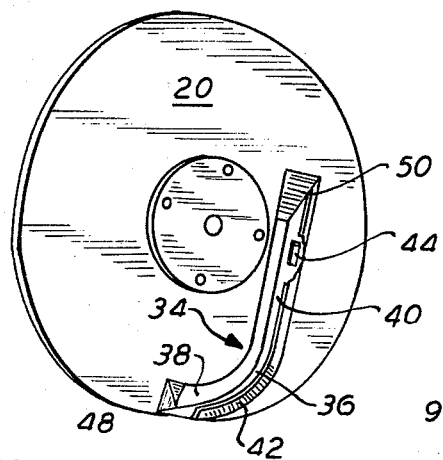
FIG. 5 is a cross-sectional view of the volumetric feeder shown in FIG. 3 from the perspective 5—5 and illustrating the J-shaped opening in the rear plate thereof.

FIGS. 2–5 illustrate views of the volumetric feeder which are not readily apparent from FIG. 1. The rear plate 20 is shown in FIG. 5 as including a J-shaped opening 34. J-shaped opening 34 communicates directly with feed chute 36. More precisely the area directly under opening 34 comprises feed chute 36. Feed chute 36 includes first section 38 which lies roughly at the periphery of rear plate 20 and substantially tangential thereto and a second section 40 which is substantially perpendicular to the first section 38 and which is directed inwardly toward the center of the rear plate 20. It will be noted however that while section 40 is directed towards the center, it does not come in contact with the actual geometric center of plate 20. On one rim of J-shaped opening 34 is a guide ledge or barrier 42. Barrier 42 extends from the first section to the second section of the J-shaped opening 34 and serves to guide work pieces into the inlet port 44 of the measuring station 46. At opposing ends of the J-shaped opening 34 are a pair of inclined plates 48 and 50. Leading end plate 48 helps to scoop work pieces into the feed chute 36 and trailing end plate 50 helps to discharge work pieces from the feed chute which have not been accepted by measuring station 46. A feed assist element 52 is shown in FIGS. 2-4 as being slightly ahead of the interior of the measuring station 46. Feed assist element 52 serves to break up jams in the flow of the work pieces and also helps to direct work pieces into the inlet port 44 of the feed station 46. Guide ledge 42, inclined plates 48 and 50 and feed assist element 52 all cooperate to direct the flow of work pieces thru feed chute 36.

Figure 6:
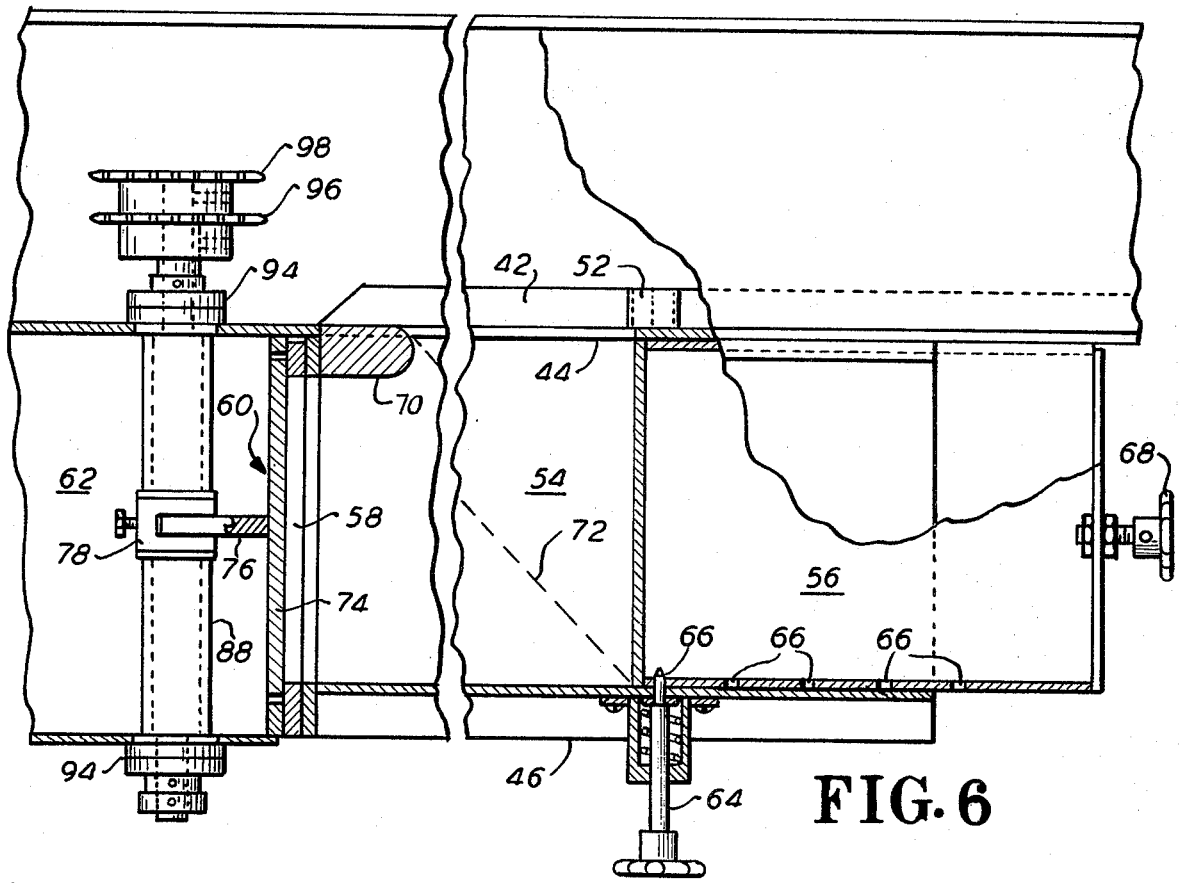
FIG. 6 is a plan view partially in cross section of the measuring station shown in FIGS. 2 thru 4.
Figure 7:
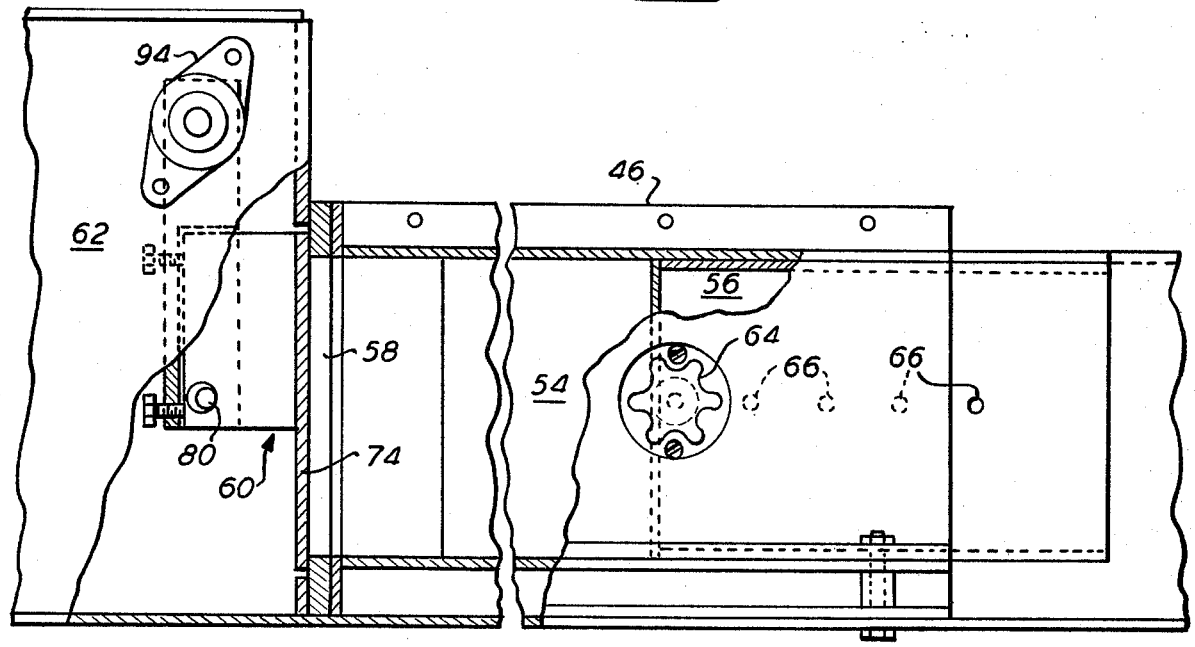
FIG. 7 is a side view of the same measuring station partially in cross section.

Measuring station 46 is shown in detail in FIGS. 6 and 7. It comprises essentially a rectangular pocket section 54 and an adjustable plunger section 56 which may be manipulated so as to control the volume of pocket 54. Pocket 54 includes an inlet port 44, previously described, and an outlet port 58. Outlet port 58 is shown in FIGS. 6 and 7 as being closed off by gate means 60 which can be seen in detail in FIGS. 8 and 9. When gate means 60 is in the open position, not illustrated, outlet port 58 communicates with discharge chute 62.

With reference to FIGS. 6 and 7 it will be appreciated that the volume of pocket 54 can be varied by adjusting the depth of penetration of plunger 56. Pocket 54 comprises a roughly rectangular box into which rectangular plunger 56 is received. The depth of penetration of the plunger 56 into pocket 54 may be adjusted by manipulating spring loaded pin 64. A knob or handle means 68 is attached at the far end of the plunger 56 for providing a purchase thereto. It is readily apparent from FIGS. 6 and 7 that the volume of the pocket 54 can be varied by simply withdrawing the spring loaded pin 64 from the pin hole 66 and then moving plunger 56 to another suitable location by means of force applied to handle 68. FIGS. 6 and 7 illustrate a plunger including five pin receiving holes 66. In this embodiment the pocket 54 may therefore assume five discrete volumes, depending upon which pin hole 66 is selected to receive spring loaded pin 64. It may under some circumstances be desirable to make the volume of pocket 54 infinitely adjustable as opposed to discretely adjustable, however, in practice it is usually not necessary to have such variety. Additionally, the spring and detent method has the advantage of being relatively more secure than other techniques.

One edge of inlet port 44 includes a rounded corner means 70. It has been found that by rounding the corner in this fashion and extending its depth into the opening of inlet port 44, it is possible to avoid having work pieces get caught in that corner or get hung up on the ledge. This is especially desirable because greater batch size consistency is achieved and also because it helps to prevent work pieces from getting caught between the gate means 60 and the edge of the outlet port 58. Superimposed in phantom line on FIG. 6 is a typical angle of repose 72. Angle of repose 72 suggests an exemplary volume of work pieces that may be retained by the measuring station pocket 54 immediately prior to the dumping of material thru gate 60 into discharge chute 62.

Figure 8:
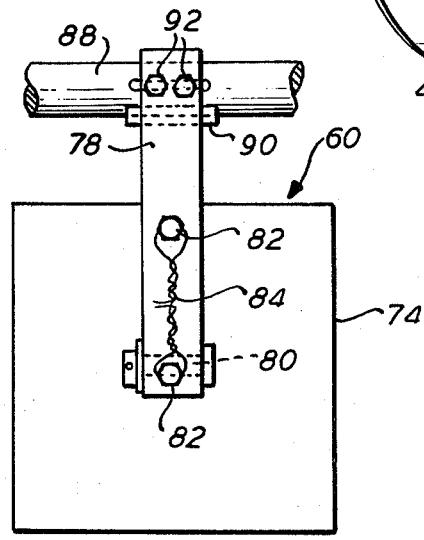
FIG. 8 is a rear view of the gate mechanism partially illustrated in FIGS. 6 and 7.
Figure 9:
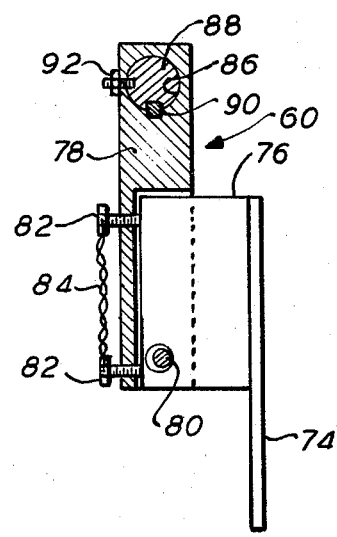
FIG. 9 is a cross-sectional view of the gate shown in FIG. 8.

As shown in FIGS. 8 and 9 the discharge gate 60 includes a flat trap door section 74, a raised section 76 rigidly integral with the plate 74 and a pivot arm connecting means 78. It will be appreciated from the drawings that raised section 76 and therefore plate 74 are connected to pivot connecting means 78 thru the use of an eccentrically mounted rod 80. Rod 80 is slightly smaller than the hole in pivot connecting means 78 thru which it is received and therefore the plate is allowed to wobble to a small degree. The degree to which the plate 74 is allowed to wobble is controlled by wobble adjusting bolts 82.

Wobble adjusting bolts 82 are locked in position by means of a securing wire 84 which is threaded thru a hole in the head of the bolts and then twisted together in such a fashion as to prevent rotation of either bolt means. It has been found in practice that a certain amount of wobble is desirable in the gate means so that it seats properly. Under the high heat conditions typically found in rotary furnaces, rigid metal gates do not close satisfactorily. If the gate does not close satisfactorily then it will tend to allow atmosphere in, thereby upsetting the delicate balance inside the furnace. Rubber-type gaskets are not desirable in this context because under the influence of extreme temperatures they tend to melt or otherwise distort. By using a wobbling gate it is possible for the gate mechanism to seek its own equilibrium under the influence of the air cylinder closing means and this equilibrium is of course the fullest closed position.

Pivot connecting means 78 includes an opening 86 which receives pivot shaft 88. Opening 86 includes a key 90 which engages a key-way type channel in pivot shaft 88. Likewise a pair of adjustable studs 92 are engageable in a second key-way in shaft 88 for additional security. Pivot shaft 88 is supported by a pair of bushings 94 located in the side-walls of discharge chute 62. Also a pair of sprockets 96 and 98 are located at one end of shaft 88.

Referring back to FIGS. 2 and 3 it is apparent how the sprockets 96 and 98 are associated with spring element 100 and air cylinder 102. Spring element 100 is connected to spring sprocket 96 by means of a bicycle-type sprocket chain 104. A similar sprocket chain 108 connects the plunger 106 of air cylinder 102 to the air cylinder sprocket 98. The end of the chain furthest removed from the plunger 106 is fastened by a pin means, not shown, to the sprocket 98; likewise, the end of sprocket chain 104 furthest removed from spring 100 is attached by a similar pin means, not shown, to sprocket 96. It is evident from the foregoing that spring means 100 opposes the movement of the air cylinder 106. Spring means 100 therefore serves as a fail-safe mechanism to close gate means 60 in case of a cylinder failure. This prevents undesirable atmospheric air from entering the rotary retort. Air cylinder 102 is connected via lines not shown to rotary fitting 24 and air cylinder supply line 28. The signal causing air cylinder 102 to extend its plunger 106 is given by a valve type limit switch 110. Valve 110 is in turn operated by a cam means 112 shown as a bump on the rim of rear plate 20. However, it would be well known to those of ordinary skill in the art to put the valve on the rotating rim and the cam in the stationary rotation. The location of elements 110 and 112 is not critical, it is only important that they be located relative to one another in such a fashion that the air cylinder 102 is actuable at least once every complete rotary cycle of the volumetric feeder 10.

As further illustrated in FIG. 2, the discharge chute 62 empties directly into the mouth 114 of the rotary furnace.

In operation the rotary furnace is turned on causing the volumetric feeder and the furnace to slowly revolve. The volumetric feeder continuously rotated during the feeding process. Before the beginning of the feed cycle the hopper section of the volumetric feeder is filled with work pieces. In practice the depth to which the volumetric feeder can be filled is dictated only by the size of the opening 16. Obviously if the depth of work pieces exceeds the height between the side-wall 18 and the opening 16, excess pieces will fall out onto the floor. After the hopper section 116 has been filled, the rotation of the feeder causes some of the work pieces to be scooped up by the first section 48 of the J-shaped opening 34. The inclination of the tapered side-walls 18 helps to gravity bias the work pieces into the opening 38. The work pieces glide easily over plate 48 thru the feed chute 36 and into the second section 40 thereof. The work pieces are also guided by ledge or barrier 42 which helps to lead some but not all of the work pieces into the inlet port 44 of the measuring station 46. Because feed chute 36 has an open top 34 excess work pieces which do not fill the measuring station pocket 54 will fall back into the mass of work pieces and are picked up in some subsequent cycle. Feed assist means 52 helps to break up jams and tends to further help direct work pieces into the pocket section 54 of measuring station 46. The inclined plate 50 helps to discharge work pieces from that end of the feed chute 36 and also helps to prevent pieces from getting hung up in the feed chute itself.

Continued rotation of the volumetric feeder causes the pocket section 54 to fill up partially or wholly with work pieces. This, of course, happens as the measuring station 46 approaches the lowest point of its revolving cycle. The volume of pocket section 54 and therefore the volume of work pieces accepted therein is adjustable by means of the pin and detent mechanism illustrated in FIGS. 6 and 7. After the pocket section has accumulated its predetermined charge of work pieces, the continued rotation of the feeder will bring it into dumping position. In the dumping position, the natural force of gravity will tend to cause the contents of the measuring station to fall into the discharge chute 62. The discharge function is accomplished by means of the gate 60 which in turn is controlled by limit valve 110 and air cylinder 102. Therefore, at the appropriate predetermined point in the cycle the cam 112 comes in contact with the follower wheel of switch 110 and the air cylinder is then caused to actuate thereby opening gate 60 and allowing the work pieces to fall thru the outlet port 58 into the discharge chute 62. Typically, gate means 60 is only opened for a short period of time so as to prevent an excess of atmospheric air from disturbing the temperature balance of the rotary retort. Continued rotation of the volumetric feeder causes the work pieces now trapped in the discharge chute 62 to slide into the mouth 114 of the rotary furnace 12. The phantom arrows shown in FIG. 2 illustrate the direction of flow of the workpieces as they sequentially proceed from the infeed chute 36 to the mouth of the furnace 114.

According to the illustrated embodiment the feeder discharges a predetermined batch volume of work pieces into the mouth of the furnace one time for each revolution. It may however be possible to put another one of these mechanisms on the plate 20 diametrically opposed to the former so that two or perhaps even more discharges may be possible per cycle.

Also, other changes of the present embodiment are possible. For instance, instead of using an air cylinder it may be desirable to affect the opening of gate 60 directly by means of a mechanical cam. This would of course eliminate the necessity of having rotary air fittings and also the necessity of having a high pressure air source. Also, as previously discussed, it may be desirable to mount the valve 110 on the rim of the wheel itself as opposed to on the frame of the furnace. Such a choice may be dictated by the particular requirements of the machine.

Additionally, it may be desirable to include a second gate mechanism either upstream or downstream of the main gate mechanism in order to further discourage the entry of atmosphere into the furnace. The two gates would act like an air lock in which only one gate is ever opened at one time. In such a manner the mouth of the furnace would never be directly communicated with atmosphere at any time.

In a general manner, while there has been disclosed effective and efficient embodiments of the invention, it should be well understood that the invention is not limited to such embodiments as there might be changes made in the arrangement, disposition, and form of the parts without the parting of the principle of the present invention and comprehended within the scope of the accompanying claims.

I claim:

1. A volumetric feeder for rotary furnaces comprising:
   a hopper for receiving work pieces, said hopper having an open front section, an inclined side section, and a rear plate section;
   said inclined section connecting said front section to said rear plate section, said inclined front section further providing bias upon said work pieces towards the periphery of said plate section;
   said plate section including a generally J-shaped slotted opening therein, said opening including a first portion roughly at the periphery of said plate and substantially tangential to it, and a second portion substantially perpendicular thereto and extending toward the interior of said plate;
   a feed chute;
   a measuring station adjacent to said feed chute and including an inlet and an outlet port therein, said feed chute communicating said inlet port to said slotted opening in said rear plate section;
   a discharge means for communicating said outlet port with the mouth of said rotary furnace; and
   a gate means for selectively allowing material to pass to said discharge means from said measuring station;
   wherein said hopper, feed chute, measuring station and discharge means are substantially rigidly connected together and, further, wherein work pieces are fed to said furnace in measured batches as said volumetric feeder is caused to rotate.

2. The invention of claim 1 wherein said J-shape, slotted opening includes a guide ledge along at least one side thereof, said ledge serving to guide said work pieces into said feed chute as said feeder rotates.

3. The invention of claim 2 wherein said measuring station includes a means for adjusting the volume thereof.

4. The invention of claim 3 wherein said measuring station comprises a substantially rectangular box and said means for adjusting the volume of said measuring station comprises a plunger which may be positioned at various discrete locations within said box, said locations being securable by a locking means.

5. The invention of claim 4 wherein said locking means comprises a spring loaded pin on the side of said box, said pin being selectively receivable in detents in said plunger.

6. The invention of claim 5 wherein said discharge means comprises a substantially spiral chute.

7. The invention of claim 6 wherein said volumetric feeder includes a means located in the center thereof for allowing producer gases to pass therethrough.

8. The invention of claim 7 wherein said gate means is openable by an air cylinder and wherein said gate means is biased closed by a spring.

9. The invention of claim 1 wherein said feed chute includes a feed assist means therein for assisting the flow of work pieces into said measuring station.

10. A volumetric feeder for rotary furnaces comprising:
    a hopper for receiving work pieces, said hopper having an open front section, an inclined side section, and a rear plate section including a slotted opening therein, said inclined section connecting said front section to said rear plate section, said inclined section further providing bias upon said work pieces towards the periphery of said plate section;
    a feed chute inset into said rear plate and situated behind said slotted opening;
    a measuring station connected to said feed chute and including an inlet and an outlet port therein, said feed chute communicating said inlet port to said slotted opening in said rear plate section, said measuring station being located adjacent to said chute but offset therefrom so as to form a distinct pocket-like area;
    a discharge means for communicating said outlet port with the mouth of said rotary furnace; and
    a gate means for selectively allowing material to pass to said discharge means from said measuring station;
    wherein said hopper, feed chute, measuring station and discharge means are substantially rigidly connected together and, further, wherein work pieces are fed to said furnace in measured batches as said volumetric feeder is caused to rotate.

11. A volmetric feeder for rotary furnaces comprising:
    a hopper for receiving work pieces, said hopper having an open front section, an inclined side section, and a rear plate section including a slotted opening therein, said inclined section connecting said front section to said rear plate section, said inclined section further providing bias upon said work pieces towards the periphery of said plate section;
    a feed chute;
    a measuring station located adjacent to said feed chute and including an inlet and an outlet port therein, said feed chute communicating said inlet port to said slotted opening in said rear plate section;
    a volume varying means for selectively altering the volume of said measuring station;
    a discharge means for communicating said outlet port with the mouth of said rotary furnace; and
    a gate means for selectively allowing material to pass to said discharge means from said measuring station;
    wherein said hopper, feed chute, measuring station and discharge means are substantially rigidly connected together and, further, wherein work pieces are fed to said furnace in measured batches as said volumetric feeder is caused to rotate.

12. A volumetric feeder for rotary furances comprising:
    a hopper for receiving work pieces, said hopper having an open front section, an inclined side section, and a rear plate section including a slotted opening therein, said inclined section connecting said front section to said rear plate section, said inclined section further providing bias upon said work pieces towards the periphery of said plate section;
    a feed chute;
    a measuring means for measuring a predetermined volume of work pieces, said means being located adjacent to said feed chute and including an inlet and an outlet port therein, said feed chute communicating said inlet port to said slotted opening in said rear plate section;

a discharge means for communicating said outlet port with the mouth of said rotary furnace; and a gate means for selectively allowing material to pass to said discharge means from said measuring means;

wherein work pieces are fed to said furnace in measured batches as said volumetric feeder is caused to rotate.

13. The method of feeding batches of work pieces into a rotating furnace, the rotating furnace including a hopper, a feed chute, a measuring station located adjacent to said feed chute and a discharge means which are substantially rigidly connected together and further including a gate means adapted to selectively open and close and disposed between said measuring station and said discharge means, said method including the steps of, loading said hopper with said work pieces, rotating said feeder so that said work pieces are collected in said feed chute, further rotating said feeder thereby causing said work pieces to fall from the chute into said adjacent measuring station under the influence of gravity, said measuring station thereby receiving a charge of work pieces of a predetermined value, further rotating said feeder, opening said gate at a predetermined point in said rotation cycle and thereby discharging said work pieces into said discharge means, and further rotating said feeder until said work pieces are discharged from said discharge means into the mouth of said rotating furnace.

* * * * *